United States Patent [19]
Victor

[11] Patent Number: 6,126,114
[45] Date of Patent: Oct. 3, 2000

[54] DOOR FOR AIRCRAFT, PARTICULARLY FOR HELICOPTER, WITH INTERCONNECTED MOVEMENTS OF UPPER AND LOWER LEAVES

[75] Inventor: Jean-Jacques Victor, Velaux, France

[73] Assignee: Eurocopter, France

[21] Appl. No.: 09/150,982

[22] Filed: Sep. 11, 1998

[30] Foreign Application Priority Data

Sep. 12, 1997 [FR] France ................................. 97 11385

[51] Int. Cl.$^7$ ........................................................ B64C 1/14
[52] U.S. Cl. .................................. 244/129.5; 244/129.4; 244/129.1; 244/118.3
[58] Field of Search ........................... 244/129.1, 129.4, 244/129.5, 118.3; 49/104, 109, 110, 111

[56] References Cited

U.S. PATENT DOCUMENTS

| | | | |
|---|---|---|---|
| 1,373,567 | 4/1921 | Overlien | 49/111 |
| 1,579,751 | 4/1926 | Buckley | 49/104 |
| 1,658,240 | 2/1928 | Graham | 49/104 |
| 2,531,263 | 11/1950 | Fink et al. | 182/97 |
| 4,024,671 | 5/1977 | Masao | 49/104 |
| 5,577,793 | 11/1996 | Kobasic | 296/146.4 |

FOREIGN PATENT DOCUMENTS 2 174 690  10/1973  France .

*Primary Examiner*—Peter M. Poon
*Assistant Examiner*—Judith A. Nelson
*Attorney, Agent, or Firm*—Piper Marbury Rudnick & Wolfe

[57] ABSTRACT

A door is provided for an aircraft. The aircraft includes a cabin having a floor and a roof. The door includes an upper and lower leaves hinged along axes approximately parallel to a longitudinal axis (X—X) of the aircraft. The leaves can swing between an open position in which each of the two leave projects outwards from the cabin and a closed position in which the two leaves are folded down on the cabin and are fixed with the cabin by locking device. The door further includes interconnecting mechanisms for connecting the two leaves to each other so that when one leaf is moved between the open and closed positions the other leaf will also move. A stopper holds one of the upper and lower leaves in the open position when the interconnecting mechanism disposes the stopper in an extended position. A driver is provided for moving one of the leaves from its closed position to its open positions The driving of one of the leaves, through the interconnecting mechanism, also moves the other of the two leaves to the open position. The driver includes a mechanism for sufficiently setting the lower leaf in motion toward the open position so that the lower leafs own weight further continues the lower leafs motion to the open position.

14 Claims, 6 Drawing Sheets

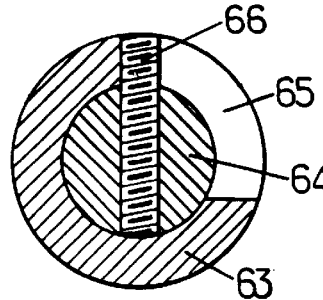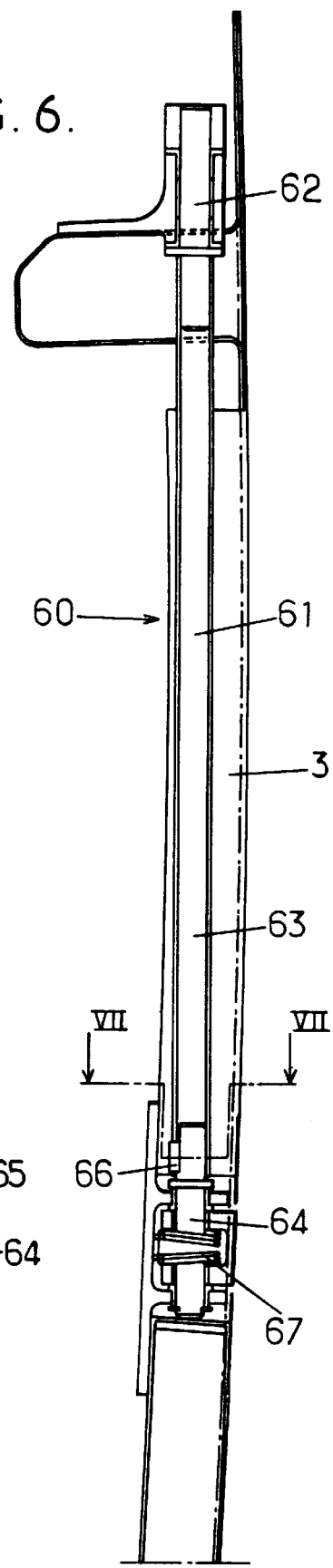

DOOR FOR AIRCRAFT, PARTICULARLY FOR HELICOPTER, WITH INTERCONNECTED MOVEMENTS OF UPPER AND LOWER LEAVES

FIELD OF INVENTION

The present invention is directed to a door opening device for an aircraft which includes a cabin comprising a floor and a roof. The door includes an upper leaf and a lower leaf hinged along axes approximately parallel to a longitudinal axis of the aircraft, swingable an open position in which each of the two leaves projects outwards from the cabin and a closed position in which the two leaves are closed down on the cabin and are fixed to it by locking means.

BACKGROUND OF THE INVENTION

The invention relates in particular to the doors for an aircraft, particularly for a helicopter, enabling the pilot and the passengers to get into and get out of them. Doors are known which are composed of two leaves which open respectively upwards and downwards, towards the outside of the aircraft.

Even if the doors enable distributing the forces on the whole of the fixing points of the two leaves on the helicopter cabin as well as minimizing being held by the wind in comparison with a door composed of only one leaf, the opening and closing of such doors is longer and more tiresome since it is necessary to handle each of the two leaves one after the other and in precise order in order to carry out a closing ensuring the safety of the aircraft in flight.

Furthermore, the lower leaf of such doors requires the use of a landing skid on which is fixed a step of significant bulk. This is harmful to the aerodynamics of the aircraft.

The invention has the objective of solving the disadvantages mentioned above by proposing a door with two leaves for which the opening and closing are made easier and which ensures an access for the passengers to board the cabin without requiring bulky steps.

SUMMARY OF THE INVENTION

To this end, in accordance with the invention, an opening system of the aforementioned type is mainly characterized in that it includes:
  means of interconnecting the movement of the two leaves between each of the open and closed positions; and
  means forming a stop for one of the upper and lower leaves in the open position, the aforementioned means forming a stop being opened out in the open position by the interconnecting means.

The opening device in accordance with the invention can possibly comprise in addition one or more of the following characteristics:
  the device includes driving means of one of the leaves from its closed position to its open position with the result that, the opening movement of one of the leaves drives, through the interconnecting means, an opening movement of the other of the two leaves;
  the driving means include means for setting in motion the opening movement of the lower leaf, which movement being then continued under the action of the own weight of the aforesaid leaf, thus driving the opening of the upper leaf;
  the interconnecting means include:
    a guide rail fixed with a vertical upright of the door frame;
    a guide runner mounted to slide in the guide rail;
    an upper rod, a first end of which is hinged on an edge of the upper leaf and a second end of which is hinged on the aforesaid guide runner, the aforesaid edge and the aforesaid vertical upright being opposite when the upper leaf is in the closed position;
    a system of rods hinged on the one hand on the aforesaid vertical upright and on the other hand on an edge of the lower leaf;
    a supple link, a first end of which is fixed on the guide runner, and a second end of which is fixed on the system of rods; and
    means of return of the supple link installed on the vertical upright in order to link the movements of the upper leaf to the movements of the lower leaf;
  the device includes a gas rod, a first end of which is fixed to the guide runner, and a second end of which is fixed with the vertical upright in order to promote the opening movement of the upper leaf and to hold it in the open position; this gas rod is optional because it only requires the hinge moment of the weight of the lower leaf to be greater than that of the upper leaf in order that the opening can be easily done;
  the system of rods includes first and second lower rods which are hinged to each other and which include respectively one end hinged on the vertical upright and one end hinged on the edge of the lower leaf;
  the second end of the supple link is fixed at a point of the first lower rod;
  the means of return of the supple link include two pulleys fixed on the vertical upright, respectively above the guide rail and the hinge point of the end of the first lower rod on the aforesaid vertical upright;
  the pulley fixed above the guide rail is fixed by suspension means so as to absorb the play of the supple link as well as the adjustment and manufacturing gaps;
  the second end of the upper rod is sliding mounted on this rod and elastic means are interposed between the second end of the upper rod and the rest of this rod so that, during closing of the upper leaf, the upper rod occupies successively:
    a first stable equilibrium position when the upper leaf is half open, a position in which the elastic means are not compressed,
    an unstable equilibrium position in which the elastic means are compressed, the upper leaf being in a quasi-closed position in which a point of the axis of rotation of the upper leaf on the cabin, the first end of this rod and the guide runner abutted in the bottom of the guide rail are aligned; and
    a second stable equilibrium position in which the upper leaf is in the closed position, the elastic means being less compressed than in the unstable equilibrium position;
  the means for setting in motion the opening movement of the lower leaf include a torsion spring interposed between the hinged together ends of the two lower rods;
  the means forming the stop includes a prop movable between a retracted position when the lower leaf is in the closed position and in which the prop is housed in the lower leaf, and an opened out position when the lower leaf is in the open position and in which the prop is abutted on the cabin;
  the prop includes an internal end rotary mounted in the lower leaf and an external end free to abut against the cabin, torsion means connecting the internal end of the prop to the end of the second lower rod hinged on the lower leaf, in order to make the rotational movement of the prop proportional to the rotational movement of the lower leaf;

the torsion means includes a torsion tube a first end of which rotates with the end of the second lower rod and a second end of which engages with a pin on which is fixed the prop, the torsion tube and the prop having perpendicular axes;

the second end of the torsion tube comprises a radial recess extending over a part of the circumference of the torsion tube and in which penetrates means forming a key mounted on the pin so that, during closing and opening movements of the lower leaf, the torsion tube rotates the pin on only a part of its rotation; and a torsion spring is carried by the pin, one end of this spring being fixed to the lower leaf and another end being fixed to the pin, so that the closing movement of the lower leaf causes compression of the spring.

BRIEF DESCRIPTION OF THE DRAWINGS

An example of an embodiment of the invention is now described with reference to the appended drawings, on which

FIG. 6 is a sectional view along the line VI—VI of FIG. 1; and

FIG. 7 is a sectional view along the line VII—VII of FIG. 6.

DETAILED DESCRIPTION OF THE PREFERRED EMBODIMENT

Figure 1:
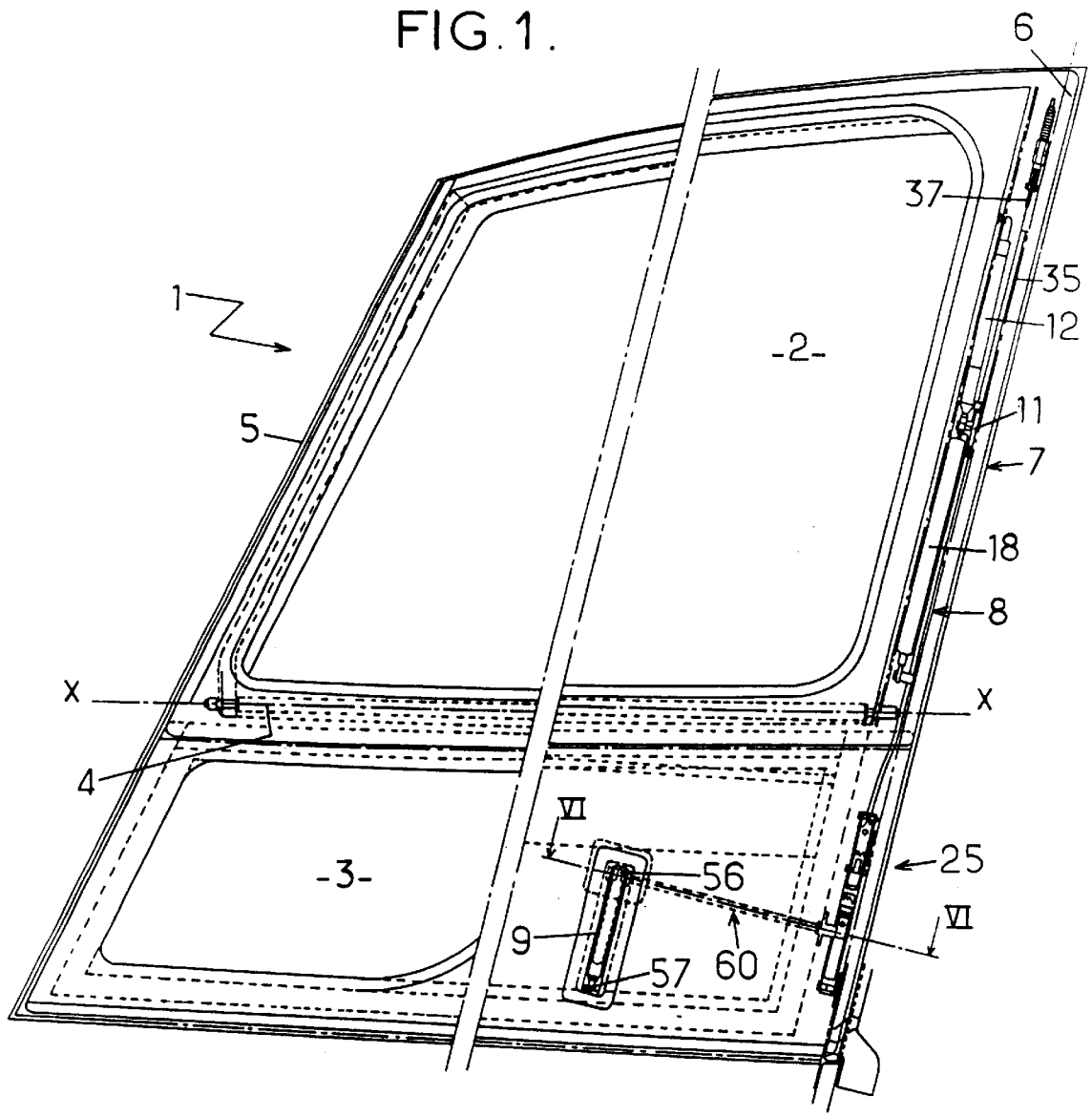
FIG. 1 is a front view of a helicopter door provided with an opening device in accordance with the present invention, the two upper and lower leaves being shown in the closed position.

FIG. 1 shows a front door 1 for a helicopter. This helicopter (not shown) includes, in a known way, a cabin 21 provided with a roof 23 and a floor 22 (shown in part in FIGS. 4 and 5). In addition, the door 1 is composed of two leaves, an upper leaf 2 and a lower leaf 3, each hinged along an axis parallel to a longitudinal axis X—X of the helicopter, near the roof 23 and the floor 22 respectively.

Figure 2:
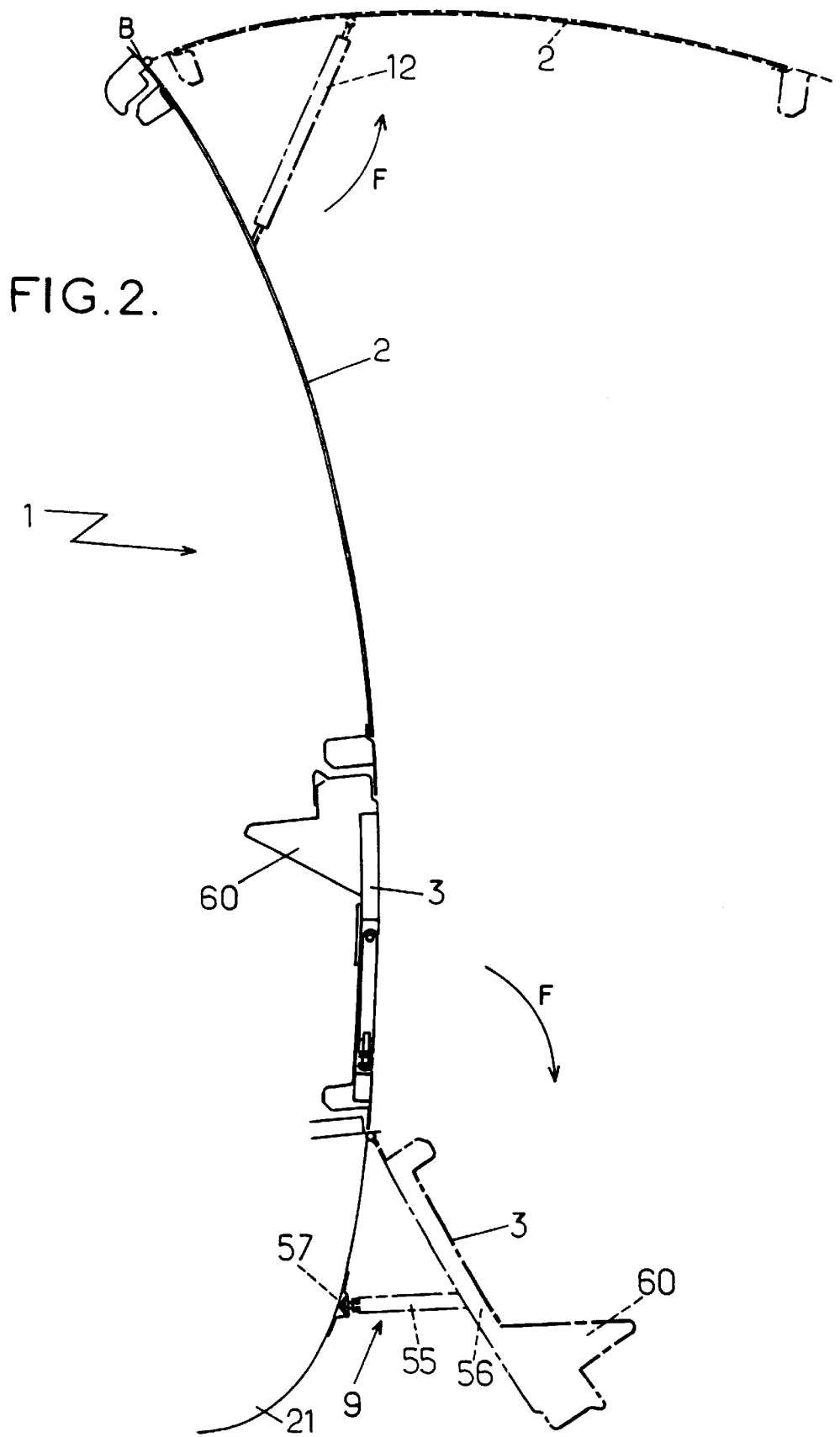
FIG. 2 is a diagrammatic side view of the two leaves of FIG. 1 shown on the one hand in the closed position, and on the other hand in the open position.
Figure 3:
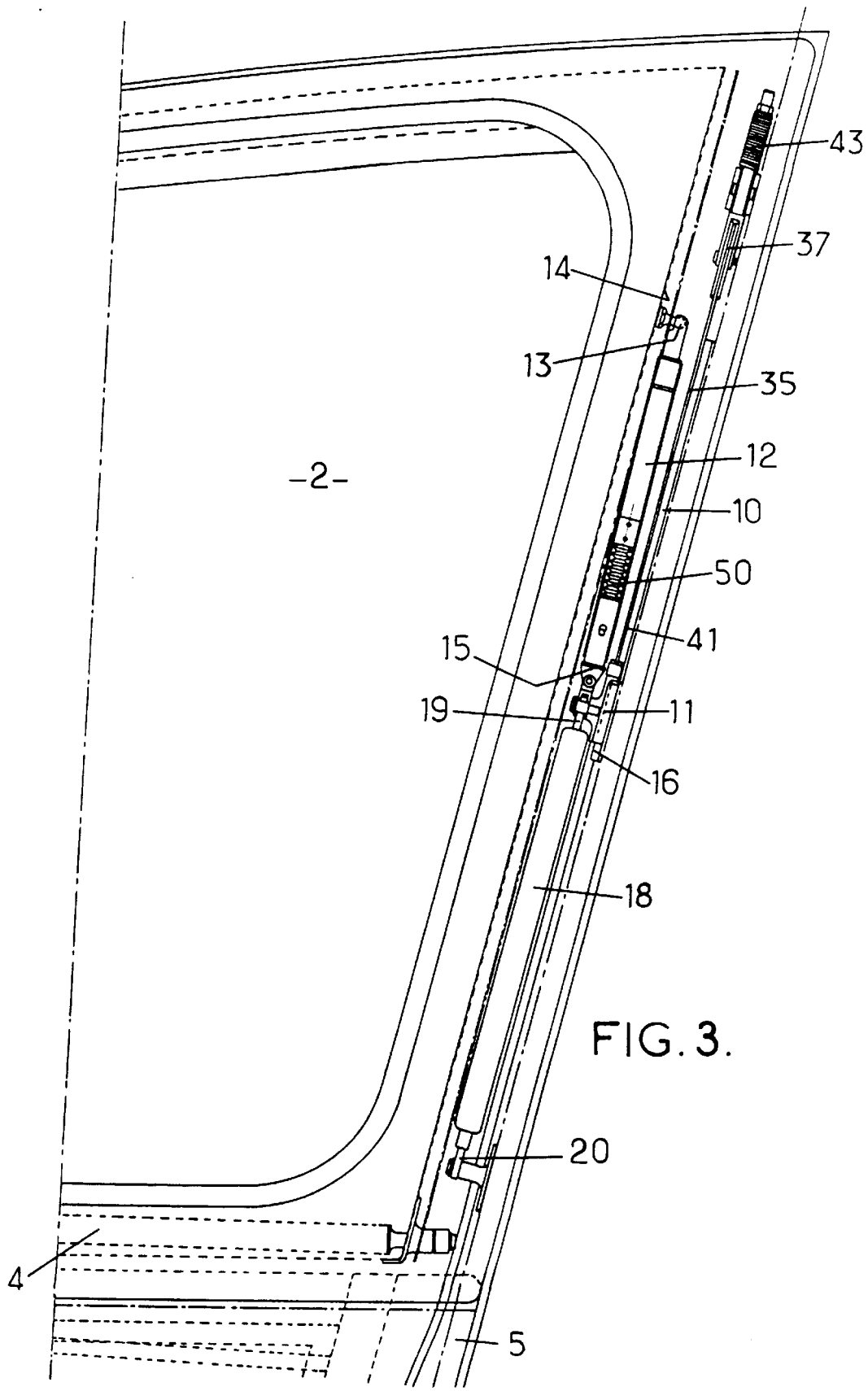
FIG. 3 is an enlarged view of a part of the upper leaf in the closed position and of the corresponding door opening device.

As it is more particularly shown in FIG. 2, each of the two upper and lower leaves opens respectively upwards and downwards toward the outside of the helicopter cabin along the arrows F. In the closed position, the lower leaf 2 is folded down on the upper leaf 3 and is held in the closed position on the cabin by locking means 4 in itself known, such that a rod penetrates into a door frame 5, and particularly in vertical uprights 6 of this frame.

In addition, the opening and closing movements of the two leaves 2 and 3 are connected by an opening device 7 which includes interconnecting means 8 of the movement of the two leaves 2 and 3 as well as a stop means 9 for forming a stop for the lower leaf 3 against the cabin 21 when it is in the open position.

The interconnecting means 8 are now to be described in comparison with FIGS. 1 and 3 to 5. They include a guide rail 10 fixed on the vertical upright 6 of the door frame 5 and in which is slidingly mounted a guide runner 11.

The interconnecting means 8 include in addition an upper rod 12 which has a first end 13 hinged on an edge 14 of the upper leaf 2 and a second end 15 which is hinged on the guide runner 11.

Figure 4:
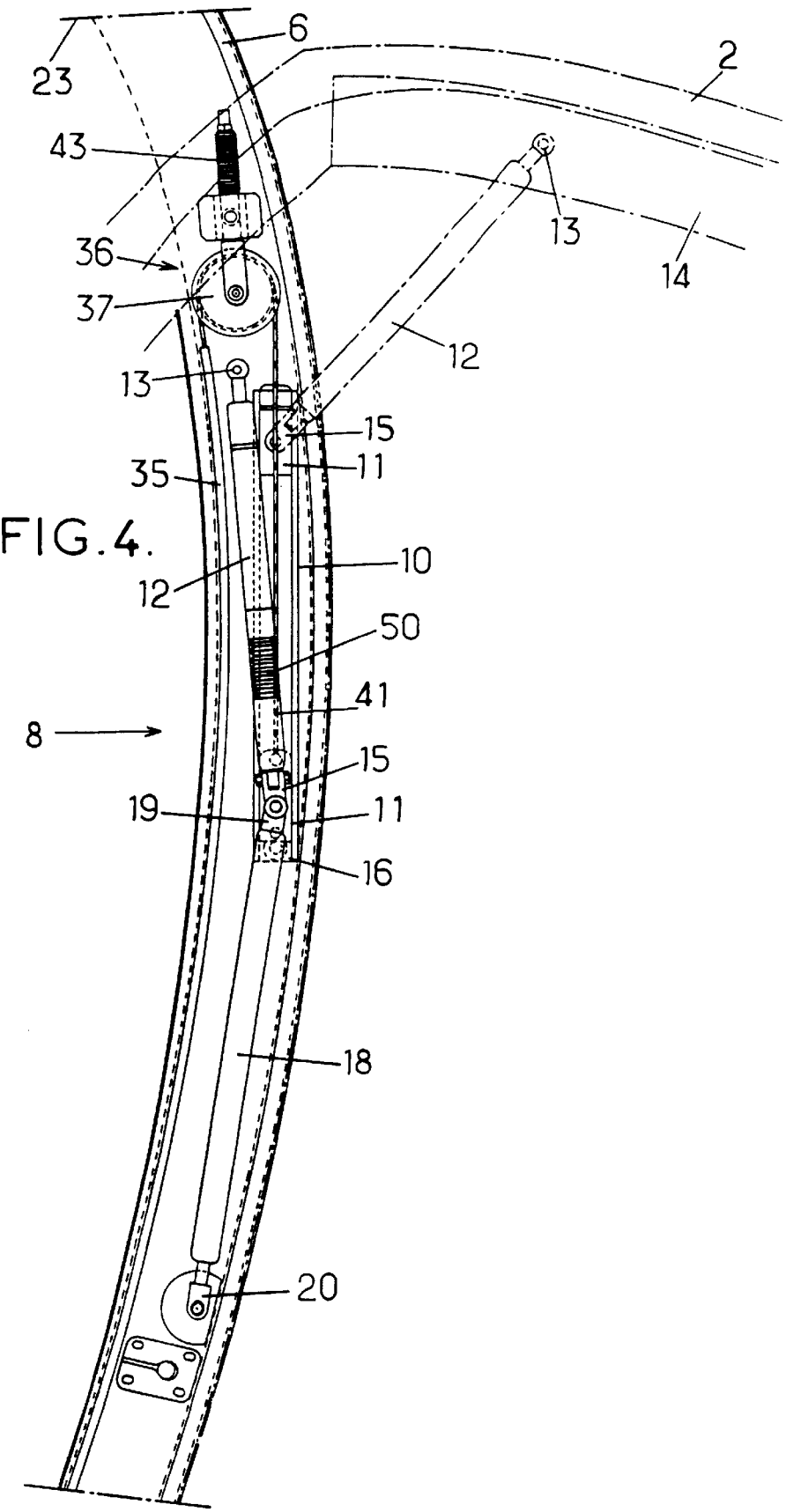
FIG. 4 is a side view of the upper leaf of FIG. 3 shown in the closed position and in the open position.

The upper leaf 2 is shown in FIG. 4 on the one hand, in the open position as chain dotted lines and on the other hand, in the closed position as continuous lines.

It is thus understood that when this leaf 2 is in the closed position, the guide runner 11 is abutted in a bottom 16 of the guide rail 10, the upper rod 12 being then approximately parallel to the vertical upright 6. When the upper leaf 2 is brought into the open position, the guide runner 11 slides in the rail 10 to be abutted at the top in this rail and thus retain the leaf 2 in the open position, projecting outwards from the cabin.

A gas rod 18 is on the one hand fixed by a first end 19 to the guide runner 11 and by a second end 20 to the vertical upright 6. This rod 18 enables promoting the opening of the upper leaf 2 and holding it in the open position as a result of the force which the rod exerts on the guide runner 11, and therefore, by means of the upper rod 12, on the upper leaf 2.

Figure 5:
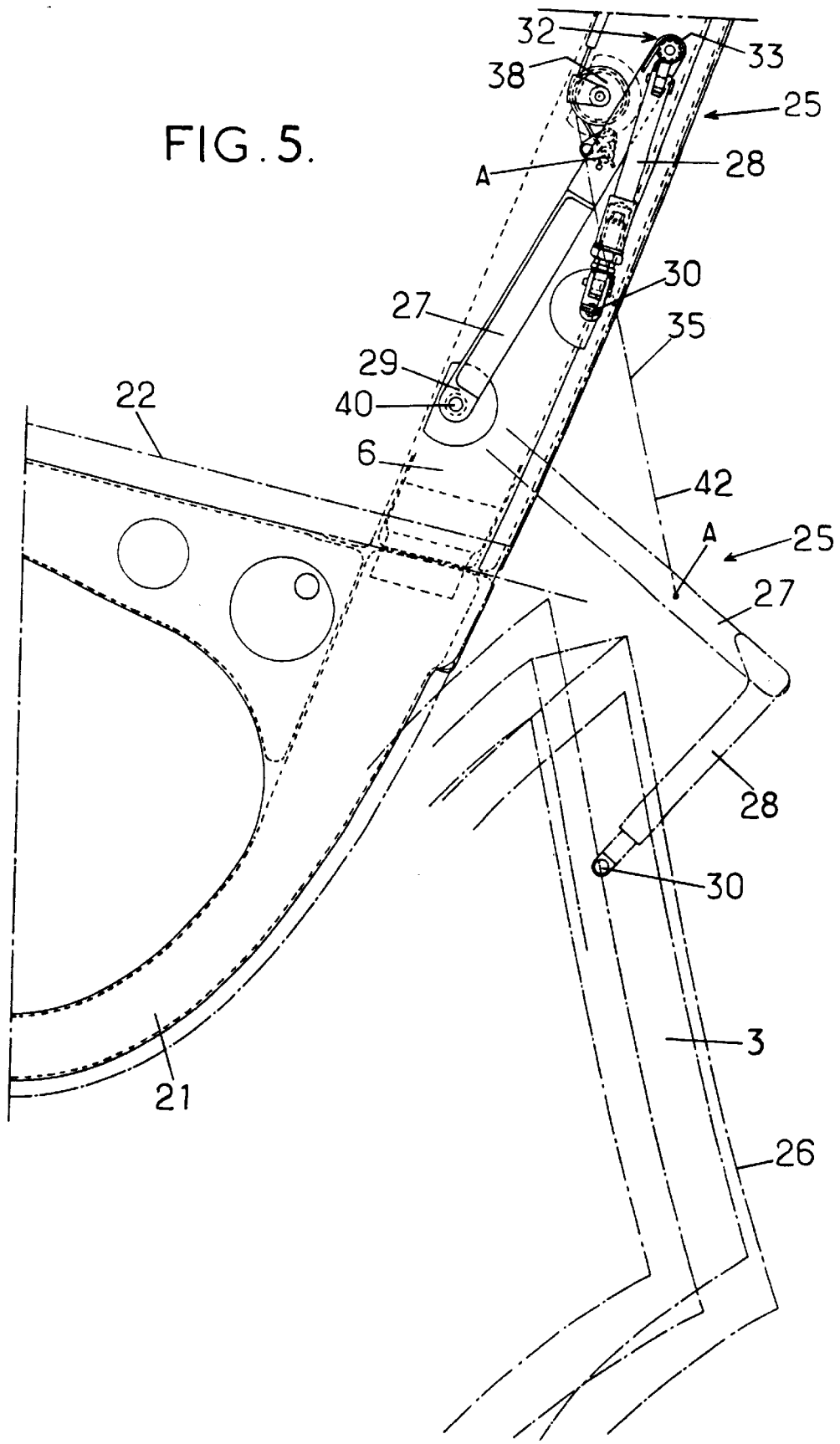
FIG. 5 is an enlarged side view of a part of the lower leaf of FIG. 1 shown in the open position and in the closed position as well as the corresponding door opening device.

FIG. 5 shows that the opening device 7 in accordance with the present invention includes in addition a system of rods 25 which is on the one hand hinged on the vertical upright 6 of the cabin, near the floor 22 and, on the other hand, on an edge 26 of the lower leaf 3.

The system of rods 25 includes a first lower rod 27 and a second lower rod 28 hinged to each other so as to form torque links. The first rod 27 is hinged by a first end 29 to the vertical upright 6 whereas the second rod 28 is hinged by a second end 30 on the edge 26.

The two lower rods 27 and 28 comprise driving means 32 intended to cause the opening of the torque links composed of these two rods and therefore to cause the opening movement of the lower leaf 3 from its closed position (shown in continuous lines) to its open position (shown in chain dotted lines).

These driving means 32 include means 33 for setting in motion the opening movement of the lower leaf 3 which continues then under the sole action of the weight of this leaf. The setting in motion means 33 consist of a torsion spring having two ends respectively supported against each of the ends, which are hinged together, of the two lower rods 27 and 28, this spring being under tension when the torque links is closed, i.e. when the lower leaf 3 is in the folded down position on the cabin 21.

The opening device 7 includes moreover a supple link 35 passed on return means 36 which includes a first pulley 37 fixed on the vertical upright 6, in a point located above the guide rail 10 and a second pulley 38 fixed on the same upright, above a hinge point 40 of the first lower rod 27 on the upright 6.

The supple link 35 has a first end 41 fixed on the guide runner 11, is passed on the first pulley 37 in order to be returned to the second pulley 38 and be fixed by a second end 42 in a point A located on the length of the first lower rod 27.

In order to absorb the plays of the supple link 35, which takes for example the form of a cable, as well as the adjustment and manufacturing gaps, the first pulley 37 is fixed to the upright 6 by suspension means 43.

Thus, when the two upper 2 and lower 3 leaves of the door 1 are to be opened, a user unlocks the locking means 4, the torsion spring 33 then gives an impulse causing the separation of the two lower rods 27 and 28, this causes setting in motion the opening movement of the lower leaf 3, this movement continuing then under the action of this leave's own weight.

The lower leaf being connected to the upper leaf 2 by the supple link 35, the downwards movement of this lower leaf causes a downwards displacement of the second end 42 of the supple link 35 and consequently an upwards movement of the first end 41 of the aforesaid link. This first end drives the guide runner 11 which then slides in the guide rail 10, thus driving the upper rod 12 and therefore causing the opening of the upper leaf 2.

The opening movement of this upper leaf is accompanied by an opening out of the gas rod 18 which promotes this movement and which holds the upper leaf 2 in the open position. This rod enables also the adjustment of the speed of opening and the dampening of the limit of the travel.

When a user wishes to close the two upper 2 and lower 3 leaves, it is sufficient that he folds down the upper leaf 2 toward the cabin 21. This movement causes a downwards displacement of the end 41 of the supple link and therefore an upwards movement of the second end 42 of this link. The position of the two pulleys 37 and 38 as well as the length of the cable 35 are adapted so that the lower leaf 3 comes into the closed position some time before the upper leaf 2. It is sufficient then to lock the upper leaf 2 on the cabin by means of the locking means 4 for the door 1 to be closed in a sure manner.

In addition, in order to ensure good closing of the upper leaf 2, the second end 15 of the upper rod 12 is movably mounted on the running part of the aforesaid rod. This end 15 is sliding mounted on the rest of the rod 12 and is biased against the first end 13 by elastic means 50. These means take for example the form of Belleville washers mounted head to tail in order to constitute a spring which is compressed when the second end 15 tends to be forced toward the first end 13.

Thus, the elastic means 50 enable the user to feel "a hard point" during closing of the upper leaf 2 onto the cabin. Indeed, when the leaf 2 is in the half open position, the elastic means 50 are not compressed and the leaf is then in a stable position. When the user continues the closing movement, the upper leaf 2 passes through a position in which a point B of the axis of rotation of the upper leaf 2 on the cabin, the first end 13 and the guide runner 11 are aligned, a position in which the elastic means 50 are compressed. In order to completely close the upper leaf 2, the user causes a slight additional rotation of this leaf, this causes a release of these means 50 with the result that the upper leaf 2 is pressed against the cabin and the user feels a "pulling" of this leaf.

Finally, the stop means 9 of the lower leaf 3 against the cabin 21, when this leaf is in the open position, include a prop 55. This prop is movably mounted on the lower leaf 3 between a retracted position in which the prop is completely housed in the leaf 3 when this leaf is in the closed position and an extended position in which the prop 55 is abutted against the cabin 21 when the leaf is in the open position.

The prop 55 is thus rotary mounted by a first internal end 56 which is hinged on the lower leaf 3 and is abutted by an external free end 57 against the cabin 21.

In order to make the rotational movement of the prop 55 proportional to the rotational movement of the lower leaf 3, torsion means 60 connect the internal end 56 of this prop to the end 30 of the second lower rod 28 which is hinged on the lower leaf 3.

As is shown more particularly in FIG. 6, the torsion means 60 include a torsion tube 61 which has a first end 62 connected to the aforesaid end 30 and a second end 63 engaging a pin 64 on which is fixed the prop 55, so that the prop 55 and the tube 61 are perpendicular, the aforesaid tube extending longitudinally in the lower leaf 3.

The second end 63 of the torsion tube 61 has a radial recess 65 (FIG. 7) which extends over only a part of the circumference of this tube. This recess 65 is passed through by a key 66 mounted on the pin 64 so as to fix this pin of the tube 61 on only a part of the rotation of this tube.

In addition, the pin 64 carries a torsion spring 67 one end of which is fixed to the lower leaf 3 and the other end of which is fixed to this pin.

During the closing movement of the lower leaf 3, the end 30 of the second lower rod 28 rotates the torsion tube 61 in the clockwise direction. The length of the radial recess 65 is such that the end 63 of the tube 61 abuts against the key 66 only after the lower leaf 3 has traveled half of its rotation path, i.e. when the tube 61 has also traveled half of its rotation path. After this abutting, the tube 61 and the pin 64 rotate integrally (FIG. 7), the end of the rotation path of the tube then compresses the torsion spring 67 and causes rotation of the prop 55 in order for it to be retracted in the lower leaf 3.

In the opposite movement, i.e. during opening of the lower leaf 3, the torsion spring 67 holds the pin 64 to rotate integrally with the torsion tube 61 on half of the rotational path of the leaf 3, and therefore on half of the rotation of the tube 61. The prop 55 is thus opened out before the lower leaf 3 has finished its rotational path to its open position. The prop 55 is therefore properly opened out to abut, with its external free end 57, against the cabin 21.

The abutting of the lower leaf 3 by means of the prop 55 enables giving the lower leaf 3 in the open position the function of a step 60. The lower leaf 3 is in addition shaped so that the step 60 occupies the function of an armrest for a pilot or a passenger when the lower leaf 3 is the closed position.

I claim:

1. A door, for an aircraft, the aircraft includes a cabin having a floor and a roof, the door comprising:

an upper leaf and a lower leaf hinged along axes approximately parallel to a longitudinal axis (X—X) of the aircraft, said leaves being swingable between an open position in which each of the two leaves projects outwards from the cabin and a closed position in which the two leaves are folded down on the cabin and are fixed with the cabin by locking means;

interconnecting means attached to both leaves for connecting the two leaves to each other so that when one is moved between the open and closed positions the other leaf will also move;

stop means attached to one of the leaves for holding one of the upper and lower leaves in the open position, the stop means being attached to the interconnecting means so that said interconnecting means disposes the stop means in an extended position when the leaves are open; and driving means for moving one of the leaves from its closed position to its open position, wherein the driving of one of the leaves through the interconnecting means, also moves the other of the two leaves to the open position, said driving means including means for sufficiently setting the lower leaf in motion toward the open position so that the lower leaf's own weight further continues the lower leafs motion to the open position.

2. A door according to claim 1, wherein the interconnecting means include:

a guide rail fixed with a vertical upright of a frame of the door;

a guide runner mounted to slide in the guide rail;

an upper rod, a first end of which is hinged in an edge of the upper leaf and a second lower end of which is hinged on the aforesaid guide runner, the aforesaid edge and the aforesaid vertical upright being opposite when the upper leaf is in the closed position;

a system of rods hinged on the one hand on the aforesaid vertical upright and on the other hand on an edge of the lower leaf;

a supple link, a first end of which is fixed on the guide runner and a second end of which is fixed on the system of rods; and return means of the supple link installed on the vertical upright in order to link the movements of the upper leaf to the movements of the lower leaf.

3. A door according to claim 2, wherein it includes a gas rod, a first end of which is fixed to the guide runner, and a second end of which is fixed with the vertical upright in order to promote the opening movement of the upper leaf, while adjusting the speed of opening and damping the limit of travel, and in order to hold the upper leaf in the open position.

4. A door according to claim 3, wherein the system of rods includes first and second lower rods which are hinged to each other and which include respectively one end hinged on the vertical upright and one end hinged on the edge of the lower leaf.

5. A door according to claim 4, wherein the second end of the supple link is fixed at a point of the first lower rod.

6. A door according to claim 5, wherein the return means of the supple link include two pulleys fixed on the vertical upright, respectively above the guide rail and the hinge point of the end of the first lower rod on the vertical upright.

7. A door according to claim 6, wherein the pulley fixed above the guide rail is fixed by suspension means so as to absorb the play of the supple link as well as adjustment and manufacturing gaps.

8. A door according to claim 2, wherein the second end of the upper rod is sliding mounted on this rod and wherein elastic means are interposed between the second end of the upper rod and the rest of this rod so that, during closing of the upper leaf, the upper rod occupies successively:

a first stable equilibrium position when the upper leaf is half open, a position in which the elastic means are not compressed, an unstable equilibrium position in which the elastic means are compressed, the upper leaf being in a quasi-closed position in which a point of the axis of rotation of the upper leaf on the cabin, the first end of this rod and the guide runner abutted in the bottom of the guide rail are aligned; and a second stable equilibrium position in which the upper leaf is in the closed position, the elastic means being less compressed than in the unstable equilibrium position.

9. A door according to claim 3, wherein the means for setting in motion the opening movement of the lower leaf include a torsion spring interposed between the hinged together ends of the two lower rods.

10. A door according to claim 3, wherein the means forming the stop includes a prop movable between a retracted position when the lower leaf is in the closed position and in which the prop is housed in the lower leaf, and an opened out position when the lower leaf is in the open position and in which the prop is abutted on the cabin.

11. A door according to claim 10, wherein the prop includes an internal end rotary mounted in the lower leaf and an external free end abutting against the cabin, torsion means connecting the internal end of the prop to the end of the second lower rod hinged on the lower leaf, in order to make the rotation movement of the prop proportional to the rotation movement of the lower leaf.

12. A door according to claim 11, wherein the torsion means includes a torsion tube a first end of which is fixed in rotation with the end of the second lower rod and a second end of which engages a pin on which is fixed the prop, the torsion tube and the prop having perpendicular axes.

13. A door according to claim 12, wherein the second end of the torsion tube comprises a radial recess extending over a part of the circumference of the torsion tube and into which penetrates means forming a key mounted on the pin so that, during closing and opening movements of the lower leaf, the torsion tube rotates the pin on only a part of its rotation travel.

14. A door according to claim 13, wherein a torsion spring is carried by the pin, one end of this spring being fixed to the lower leaf and another end being fixed to the pin, so that the closing movement of the lower leaf causes compression of the spring.

* * * * *